United States Patent [19]

Saito et al.

[11] Patent Number: 4,982,332
[45] Date of Patent: Jan. 1, 1991

[54] ROAD DATA GENERATING METHOD FOR USE IN AN ON-BOARD NAVIGATION SYSTEM

[75] Inventors: Masaki Saito; Takashi Kashiwazaki, both of Kawagoe, Japan

[73] Assignee: Pioneer Electronic Corporation, Tokyo, Japan

[21] Appl. No.: 330,272

[22] Filed: Mar. 29, 1989

[30] Foreign Application Priority Data

Jun. 27, 1988 [JP] Japan ................... 63-158288

[51] Int. Cl.$^5$ ............................... G06F 15/50
[52] U.S. Cl. ..................... 364/449; 364/443; 340/995
[58] Field of Search ............... 364/449, 447, 450, 454; 340/990, 995

[56] References Cited

U.S. PATENT DOCUMENTS

| | | | |
|---|---|---|---|
| 4,791,572 | 12/1988 | Green, III et al. | 364/449 |
| 4,792,907 | 12/1988 | Ikeda et al. | 364/449 |
| 4,796,191 | 1/1989 | Honey et al. | 364/450 |
| 4,814,989 | 3/1989 | Döbereiner et al. | 364/444 |
| 4,839,700 | 6/1989 | Ando et al. | 364/449 |
| 4,879,658 | 11/1989 | Takashima et al. | 364/449 |
| 4,888,699 | 12/1989 | Knoll et al. | 364/449 |

Primary Examiner—Thomas G. Black
Attorney, Agent, or Firm—Fleit, Jacobson, Cohn, Price, Holman & Stern

[57] ABSTRACT

A road data generating method for use in an on-board navigation system. Points on roads in a map are expressed in numerical form and memorized as map data previously, and co-ordinates of the present position of the vehicle and the compass direction of the movement of the vehicle are detected and the distance to a point on a road nearest to the present position and the angle of the road at that point are determined on the basis of the map data, as decision values for the generation of road data, every time a certain distance is traveled by the vehicle. Judgment is made as to whether or not there already is registered learning data in the vicinity of the present position when the decision values exceed the predetermined values, and standard deviations of the distance and the angle with respect to the registered learning data are calculated when there is the registered learning data. The registered learning data is registered as the road data if the standard deviations are equal to or smaller than predetermined values.

5 Claims, 3 Drawing Sheets

ROAD DATA GENERATING METHOD FOR USE IN AN ON-BOARD NAVIGATION SYSTEM

BACKGROUND OF THE INVENTION

1. Field of the Invention

The present invention relates to a method of generating road data for use in an on-board (mounted in a vehicle) navigation system.

2. Description of Background Information

Recently, navigation systems to be mounted in a vehicle have been developed and are entering into a stage of practical application, which navigation systems are constructed such that digitized map data is previously stored in a storage medium such as the CD(compact disc)-ROM, map data of a region covering a given area including the present position of the vehicle is read out from the storage medium while the present position of the vehicle is being recognized, so that a map around the location of the vehicle is displayed on a display, and a "vehicle's position" indicating the present position of the vehicle is automatically indicated in the map being displayed.

On the other hand, new roads are regularly constructed for various reasons such as regional development, re-planning of streets, or for relieving traffic congestion. With respect to such new roads, it is possible to display them on the display unit of the system if the user of the navigation system purchases a storage medium on which map data including road data of new roads is recorded. However, with such a procedure, it is necessary for the user to purchase a new storage medium of a high price every time a new road is constructed. This means that the user has to bear the expenses and it is desirable to take a measure to deal with such a problem.

OBJECT AND SUMMARY OF THE INVENTION

The present invention is based on the above point, and an object to the present invention is to provide a road data generating method for use in an on-board navigation system, in which road data can be generated and the display of the road is enabled for a new road along which the vehicle passes frequently, without the necessity of purchasing a new recording medium.

According to the present invention, a road data generating method for use in an on-board navigation system is characterized by the steps of: previously expressing each point on the roads in a map in numerical form and memorizing them as map data; detecting coordinates of the present position of the vehicle and the compass direction of the movement of the vehicle and as well determining the distance to a point on a road nearest to the present position and the angle of the road at that point on the basis of the map data, as decision values for the generation of the road data, every time a certain distance is traveled by the vehicle; judging as to whether or not there already is registered learning data in the vicinity of the present position when the decision values exceed predetermined values; registering coordinate data of the present position as locus data, if an error angle of the present value of the compass direction of the movement of the vehicle with respect to the previous value is greater than a predetermined angle, when there is no learning data; calculating standard deviations of the distance and angle with respect to the learning data when there is the learning data; registering the locus data as the learning data if registration of the locus data has been made beforehand, when the decision value is smaller than a predetermined value; and registering the learning data as the road data if the standard deviations are equal to or smaller than predetermined values.

BRIEF DESCRIPTION OF THE DRAWINGS

FIG. 2 is a diagram showing the arrangement of FIGS. 2A and 2B.

DETAILED DESCRIPTION OF PREFERRED EMBODIMENTS

The embodiment of the present invention will be explained in detail hereinafter with reference to the accompanying drawings.

Figure 1:
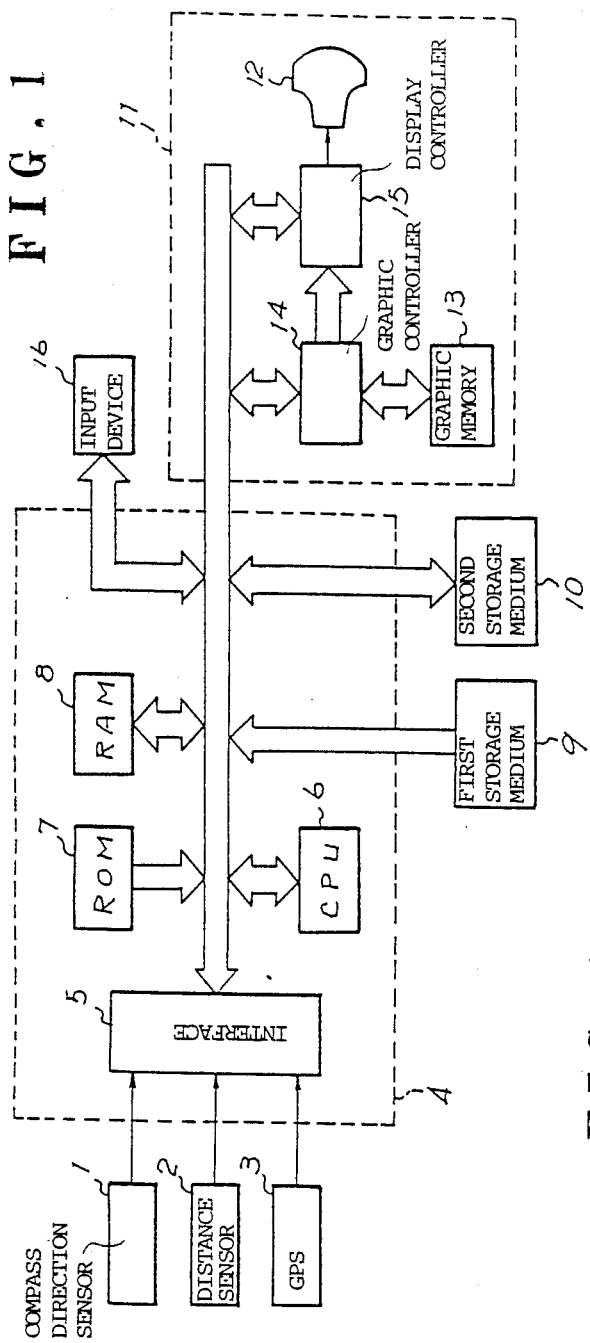
FIG. 1 is a block diagram showing an example of on board navigation system in which a road data generation method according to the present invention is adopted.

FIG. 1 is a block diagram showing an example of the on-board navigation system in which the road data generating method according to the present invention is adopted. In the figure, the numeral 1 denotes a compass direction sensor which determines the direction of the vehicle on the basis of the terrestrial magnetism (magnetic field of the earth), for example. The reference numeral 2 denotes a distance sensor for sensing the traveling distance of the vehicle, and the reference numeral 3 denotes a GPS (Global Positioning System) for detecting the present position of the vehicle from longitudinal and latitudinal information, etc. Detection outputs of these sensors and system are supplied to a system controller 4.

The system controller 4 is made up of an interface 5 which receives the detection outputs from the sensors (or system) 1 through 3 and performs the processes such as A/D (Analog to Digital) conversion, a CPU (Central Processing Unit) 6 which performs the calculation of the traveled distance of vehicle and the rate of change of the compass direction of the vehicle's movement with respect to the traveled distance, and so on, on the basis of output data of the sensors (or the system) 1 through 3 supplied from the interface 5 sequentially, a ROM (Read Only Memory) 7 in which various processing programs of the CPU 6 and other necessary information are previously stored, and a RAM (Random Access Memory) 8 into and from which information necessary for executing programs is written and readout.

As an external memory device, the system is provided with a first storage medium 9 of non-volatile type for only reading-out, and a second storage medium 10 of nonvolatile type which is used for writing and reading-out. The first storage medium 9 is made up of a CD-(Compact Disc) ROM or an IC card or the like having a large capacity, and in which digitized (in the numerical form) map data is stored. The second storage medium 10 is made up of a digital audio tape (DAT) or an IC card or the like, and into which map data such as newly generated road data is recorded and retained therein. The CPU 6 performs control operations, when the vehicle is running, to determine the present position of the vehicle on the basis of each output data of the distance sensor 2 and the GPS 3, and gather from the first storage medium 9 the map data of a region of a given area including the present position of the vehicle, and memorize the gathered data into the RAM 8 temporarily, and also supplies those data to a display unit 11.

The display unit 11 is made up of a display unit 12 such as a CRT, a graphic memory 13 made up of a V(Video)-RAM for example, a graphic controller 14 which depicts the map data supplied from the system controller 4 in the graphic memory 13 as image data and outputs this image data, and a display controller 15 which performs control operations to display a map on the CRT display unit 12 on the basis of image data outputted by the graphic controller 14. An input device 16 such as a keyboard is provided, so that various commands and the like are supplied to the system controller 4 in accordance with the key entry by the user.

Figure 2A:
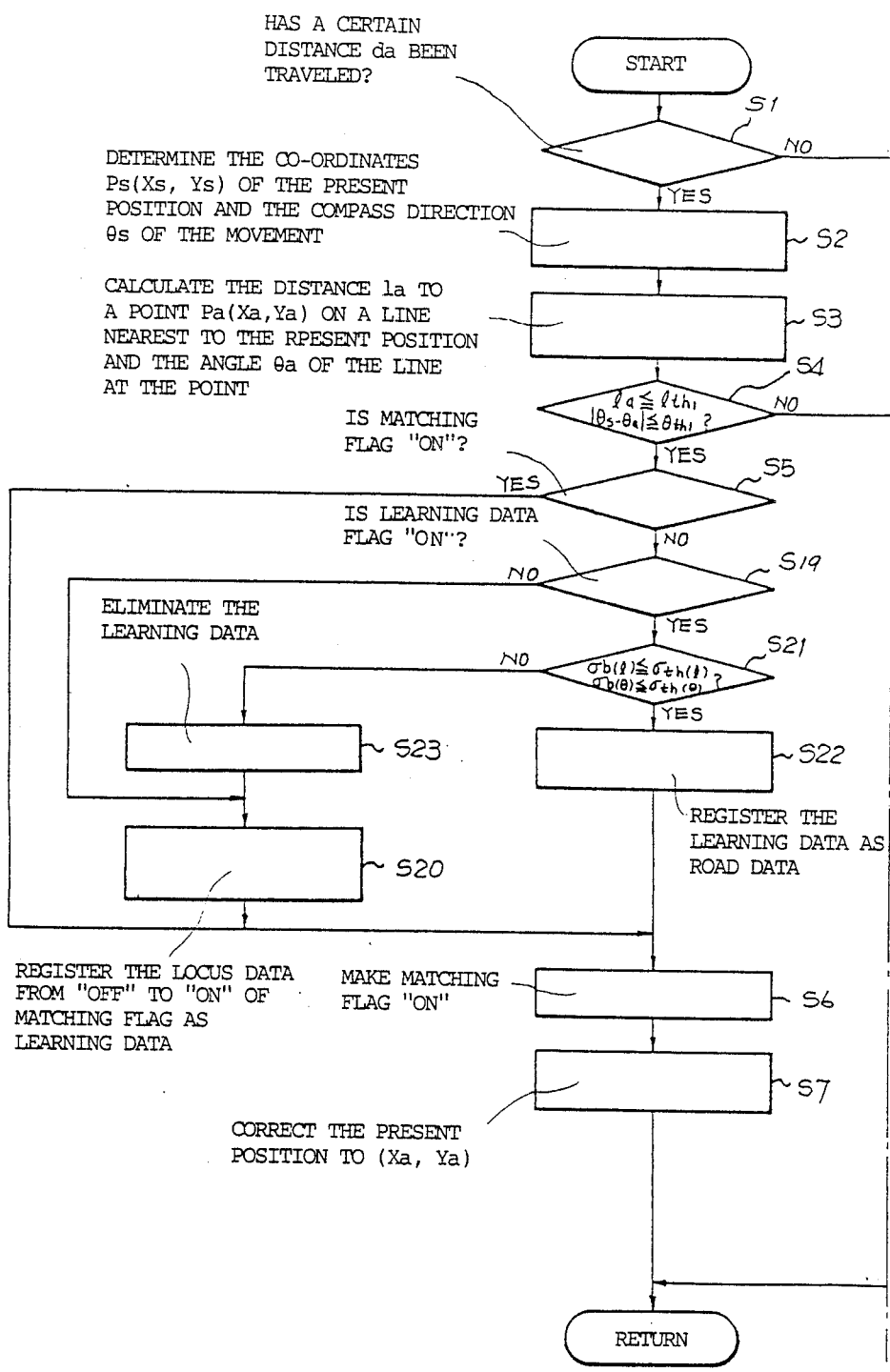
FIGS. 2A and 2B are flowcharts showing the procedure of the road data processing method which is executed by the CPU according to the present invention.
Figure 2B:
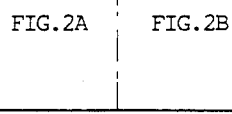
Figure 2B:
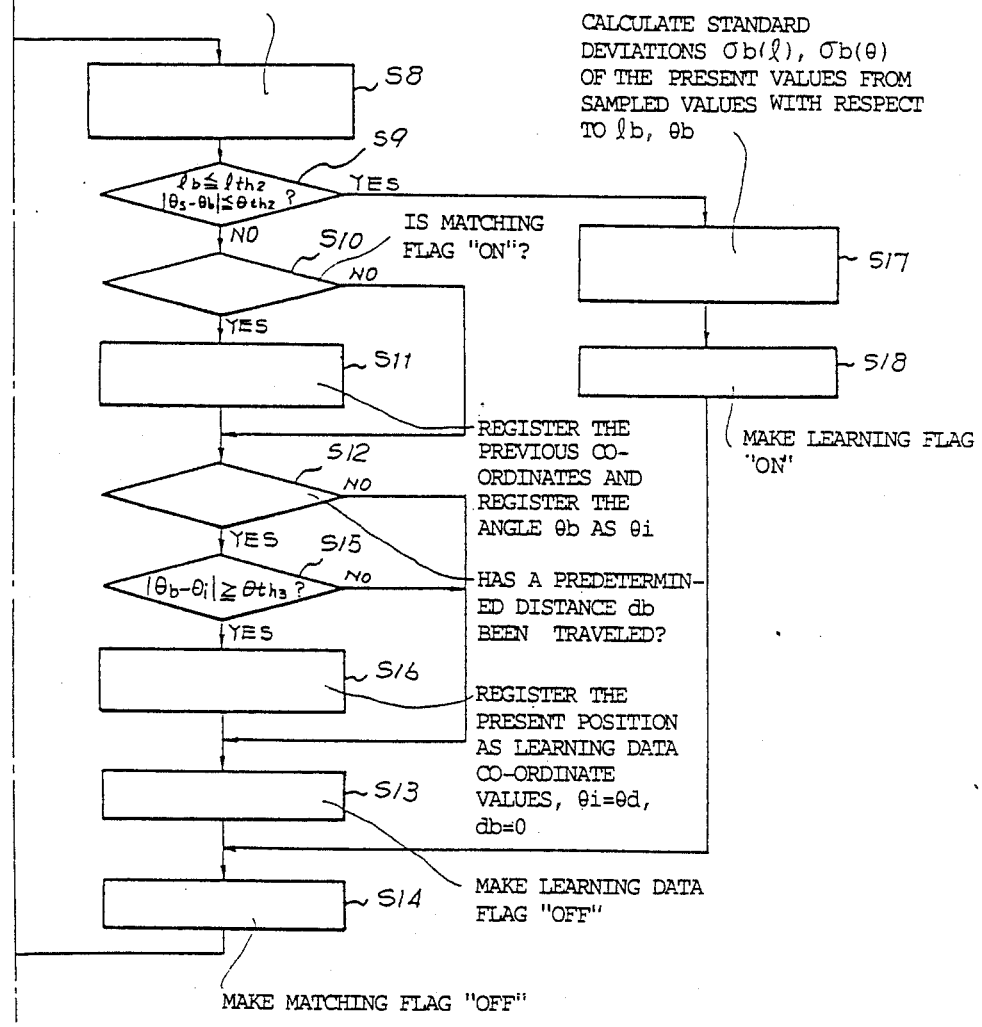

The steps of processing in the road data generating method according to the present invention which are executed by the CPU 6 will be explained with reference to the flowcharts of FIGS. 2A and 2B. It is assumed that an estimation point of the present position of the vehicle is periodically calculated in a main flow (not shown) on the basis of the output data of the distance sensor 2, and this routine is called at predetermined timings. It is also assumed that a map of a region covering a predetermined area including the present position is displayed on the display unit 12 on the basis of map data read-out from the first storage medium 9 using the data of the vehicle's present position.

Figure 3:
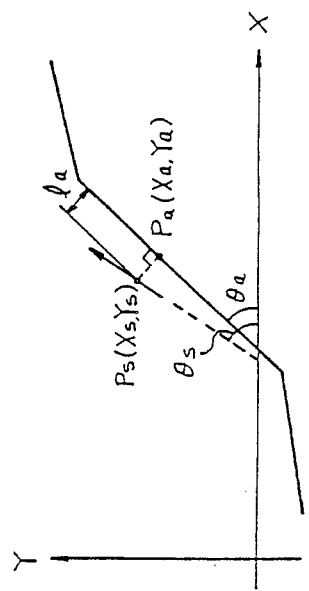
FIG. 3 is a diagram showing relations among the coordinates Ps (Xs, Ys) and the compass direction $\theta s$ of the vehicle's movement at the present position, and the distance la to a point Pa (Xa, Ya) on a line nearest to the present position and the angle $\theta a$ of the line at that point.

At first, the CPU 6 judges as to whether or not the vehicle has traveled a certain distance da (step S1). This "certain distance" means the distance of a certain value along a route on which the vehicle actually traveled. When the vehicle traveled the certain distance da, the CPU 6 determines the co-ordinates Ps (Xs, Ys) of the present position on the basis of the output data of the distance sensor 2, and further determines the compass direction $\theta s$ of the vehicle's movement on the basis of the output data of the compass direction sensor 1 (step S2). Subsequently, as illustrated in FIG. 3, the CPU 5 calculates the distance la to a point Pa (Xa, Ya) on a line which is nearest to the present position (the road is expressed by a series of lines connected end to end) and the angle $\theta a$ of the line at the point Pa (step S3). Then, the CPU 6 judges as to whether the calculated distance la is equal to or smaller than a predetermined value $lth_1$ and the error of compass direction of the present position with respect to the nearest line, that is $|\theta s - \theta a|$, is smaller than $\theta th_1$ (step S4).

If $la \leq lth_1$ and $|\theta s - \theta a| \leq \theta th_1$ at the same time, the CPU 6 judges as to whether or not what is called a map matching, for adjusting the present position to the point Pa (Xa, Ya) on the nearest line, has been effected in the previous time (step S5). Specifically, this judgment is performed by judging whether a matching flag is "ON" or not. If the matching flag is "ON", the CPU 6 makes the matching flag "ON" for the second time (step S6), and subsequently adjust the present position to the point Pa (Xa, Ya) on the nearest line (step S7).

If $la > lth_1$ and $|\theta s - \theta a| > \theta th_1$ at the same time, the CPU 6 determines the distance lb to a point Pb (Xb, Yb) on a line according to the learning data which is nearest to the present position and the angle $\theta b$ on the point Pb (step S8). Then, the CPU 6 judges as to whether or not the calculated distance lb is equal to or smaller than a predetermined value $lth_2$ and the error of the compass direction of the present position with respect to the nearest line according to the learning data, that is $|\theta s - \theta b|$, is equal to or smaller than a predetermined value $\theta th_2$ (step S9). In short, the judgment as to whether or not learning data exists in the vicinity of the present position is performed in steps S8 and S9.

If there is no learning data in the vicinity of the present position, the CPU 6 judges as to whether or not the matching flag is "ON" (step S10). If the matching flag is "ON", it means that the map-matching has been performed until the last time, and the CPU 6 registers the co-ordinate values of the previous time and registers the angle $\theta b$ as $\theta i$ (step S11). Subsequently, the CPU 6 judges as to whether or not the vehicle has traveled a certain distance db which is greater than the distance da (step S12). If the vehicle has not traveled the certain distance db, then the CPU 6 makes a learning data flag, which indicates that there is learning data in the vicinity, "OFF" (step S13), and further makes the matching flag "OFF" (step S14). Then, the program goes back to the main flow. If it is judged in step S10 that the matching flag is "OFF", then the program directly proceeds to the step S12. Furthermore, if it is detected in step S12 that the vehicle has traveled the certain distance db, then the CPU 6 judges as to whether or not the error of present value $\theta b$ of the compass direction of the vehicle's movement with respect to the previous value $\theta i$, that is $|\theta b - \theta i|$, is greater than a predetermined value $\theta th_3$ (step S15). If $|\theta b - \theta i| < \theta th_3$, the program directly proceeds to step S13. If $|\theta b - \theta i| \geq \theta th_3$, the CPU 6 registers the co-ordinate data Ps (Xs, Ys) of the present position as the co-ordinate values of the learning data, and renders $\theta i = \theta b$, and $db = 0$ (step S16). Subsequently the program proceeds to the step S13. By the repetition of the above-described processes, co-ordinate data of the present position is registered as locus data every time the vehicle travels the certain distance db.

If it is judged in step S9 that there is learning data in the vicinity of the present position, then the CPU 6 calculates, by a statistical process, standard deviations $\sigma b(l)$ and $\sigma b(\theta)$ of the present values from the sampled values, with respect the distance lb to the point Pb (Xb, Yb) on the line according to the learning data which is nearest to the present position and the angle $\theta b$ of the line at that point (step S17). Subsequently, the learning data flag is made "ON" (step S18), and the program proceeds to step S14.

On the other hand, if it is judged for the second time in step S4 that $la \leq lth_1$ and $|\theta s - \theta a| \leq \theta th_1$ at the same time, the CPU 6 subsequently judges as to whether or not the matching flag is "ON"0 or not (step S5). However, since the registration of locus data has been performed up to that time, the matching flag is "OFF". Therefore, the CPU 6 judges as to whether or not there is learning data in the vicinity of the present position, that is, whether or not the learning data flag is "ON" (step S19). If the learning data flag is "OFF", it means that the registration process of the locus data has been performed, the CPU 6 registers the locus data from turn "ON" to turn "OFF" of the matching flag (step S20). After that, the program proceeds to step S6.

If the learning data flag is "ON", it means that the calculation process of the standard deviations $\sigma b(l)$ and $\sigma b(\theta)$ has been performed, the CPU 6 judges as to whether or not the standard deviations $\sigma b(l)$ and $\sigma b(\theta)$ are smaller than predetermined values $\sigma$th(l) and $\sigma$th($\theta$) respectively (step S21). If the standard deviations are equal to or smaller than the predetermined values, the CPU 6 registers the learning data as the road data (step S22). After that, the program proceeds to step S6. If, on the other hand, the standard deviations are larger than the predetermined values, the CPU 6 eliminates the learning data (step S23). Subsequently, the program proceeds to step S20.

The road data registered in the manner explained above is then stored into the second storage medium 10 so that its correspondency with the map data displayed on the display unit 12 is maintained. Subsequently, when the map data is read-out from the first recording medium 9 and displayed on the display unit 12, new roads can be displayed simultaneously by reading-out the road data corresponding to the map data from the second storage medium 10. Thus, new roads through which the vehicle passes relatively frequently can be displayed on the map on the display unit 12 without purchasing a new one of the first storage medium 9 carrying new road data.

As explained in the foregoing, the road data generating method according to the present invention is constructed that, when the vehicle passes a new road frequently, locus data obtained while the vehicle passed through the new road are registered as road data. By this feature, the new road can be depicted on the display unit on the basis of this road data. Thus, new roads through which the vehicle passes relatively frequently can be displayed on the map without purchasing a new one of high-priced storage medium.

What is claimed is:

1. A new road data generating method for adding new roads into a map database for use in an on-board navigation system mounted in a vehicle, comprising the steps of:

previously expressing points on roads in a map in numerical form and memorizing them as map data;

detecting co-ordinated of a present position of the vehicle and compass direction of the movement of the vehicle and determining the distance to a point on a road nearest to the present position and the angle of said road at said point on the basis of said map data, as decision values for the generation of road data, every time a certain distance is traveled by the vehicle;

registering learning data depending on whether or not said decision valued exceed predetermined values;

judging as to whether or not there already is registered learning data in the vicinity of the present position when said decision values exceed said predetermined values;

calculating standard deviations of said distance and said angle with respect to said registered learning data when there is said registered learning data; and registering said registered learning data as said new road data if said standard deviations are equal to or smaller than predetermined values.

2. A new road data generating method as claimed in claim 1, wherein said step of registering learning data comprises steps of: registering co-ordinate data of the present position as locus data on condition that an error angle of the present value of the compass direction of the movement of the vehicle with respect to a previous value of the compass direction is greater than a predetermined angle, if there is no learning data when said decision values exceed said predetermined values; and registering said locus data as learning data if registration of the locus data has been made beforehand, when said decision values are equal to or smaller than said predetermined values.

3. A new road data generating method as claimed in claim 2, wherein a magnitude of said error angle of the present value of the compass direction of the movement of the vehicle with respect to a previous value of the compass direction is judged every time the vehicle travels a second certain distance which is longer than said certain distance.

4. A new road data generating device for adding new roads into a map database for use in an on-board navigation system mounted in a vehicle, comprising:

first means for detecting compass direction of the movement of the vehicle;

means for sensing distance travelled by the vehicle;

second means for detecting present position of the vehicle;

first memory means for storing map data;

second memory means for storing newly generated road data;

means for processing data received from said first memory means, first and second detecting means and sensing means to produce map data representing present position of the vehicle and if said new road data is detected, storing said new road data in said second memory means; and display means for displaying map data received from said processing means.

5. A new road data generating device as claimed in claim 4, wherein said means for processing comprises:

means for receiving said data from said sensing means, first memory means and first and second detecting means; means for calculating distance travelled by the vehicle and detecting new road data from data received from said receiving means;

first means for storing processing programs used by said calculating means; and second means for storing information for executing said processing programs stored in said first storing means.

* * * * *